(12) United States Patent
Langendijk et al.

(10) Patent No.: US 12,314,808 B2
(45) Date of Patent: May 27, 2025

(54) UNIDIRECTIONAL TRANSFER OF DATA FROM SENDER TO RECEIVER

(71) Applicant: LiveDrop B.V., Eindhoven (NL)

(72) Inventors: Erno Hermanus Antonius Langendijk, Eindhoven (NL); Philip Spannring, Eindhoven (NL); Jurjen Caarls, Eindhoven (NL)

(73) Assignee: LIVEDROP B.V., Eindhoven (NL)

( * ) Notice: Subject to any disclaimer, the term of this patent is extended or adjusted under 35 U.S.C. 154(b) by 0 days.

(21) Appl. No.: 18/424,198

(22) Filed: Jan. 26, 2024

(65) Prior Publication Data

US 2024/0256803 A1   Aug. 1, 2024

(30) Foreign Application Priority Data

Jan. 30, 2023  (EP) ..................................... 23153880

(51) Int. Cl.
 *G06K 7/14* (2006.01)
 *G06K 7/10* (2006.01)
 *G06K 19/06* (2006.01)

(52) U.S. Cl.
 CPC ....... *G06K 7/10722* (2013.01); *G06K 7/1417* (2013.01); *G06K 19/06037* (2013.01)

(58) Field of Classification Search
 CPC . G06K 7/1417; G06K 7/1443; G06K 19/0603
 USPC .................................................... 235/462.11
 See application file for complete search history.

(56) References Cited

U.S. PATENT DOCUMENTS

| | | | |
|---|---|---|---|
| 8,186,572 B2 * | 5/2012 | Herzig | G06K 7/1093 235/375 |
| 9,495,571 B1 | 11/2016 | Xiao | |
| 2006/0071077 A1 | 4/2006 | Suomela | |
| 2013/0153666 A1 | 6/2013 | Edwards | |
| 2014/0231501 A1 * | 8/2014 | Mykhailenko | G06K 7/1456 235/375 |
| 2015/0269466 A1 * | 9/2015 | Inotay | H04L 63/0823 235/494 |
| 2017/0032311 A1 | 2/2017 | Rizzolo | |
| 2021/0312151 A1 | 10/2021 | Scherly | |

* cited by examiner

*Primary Examiner* — Toan C Ly
(74) *Attorney, Agent, or Firm* — NIXON & VANDERHYE P.C.

(57) ABSTRACT

A method, system and devices are provided for unidirectional transfer of data from a sender device (100) to a receiver device (200). At the sender device, respective parts of the data are encoded to generate respective 2D barcodes, and the 2D barcodes are sequentially displayed on a display (142). At the receiver device, an image sensor (222) is used to capture the sequentially displayed 2D barcodes to obtain a series of captured images, and in each or a subset of the series of captured images, detect a position of a respective 2D barcode in the captured image, scan the 2D barcode at the identified position to obtain barcode data, and decode the barcode data to, together with the barcode data obtained from other captured images, obtain a received version of the transmitted data.

18 Claims, 8 Drawing Sheets

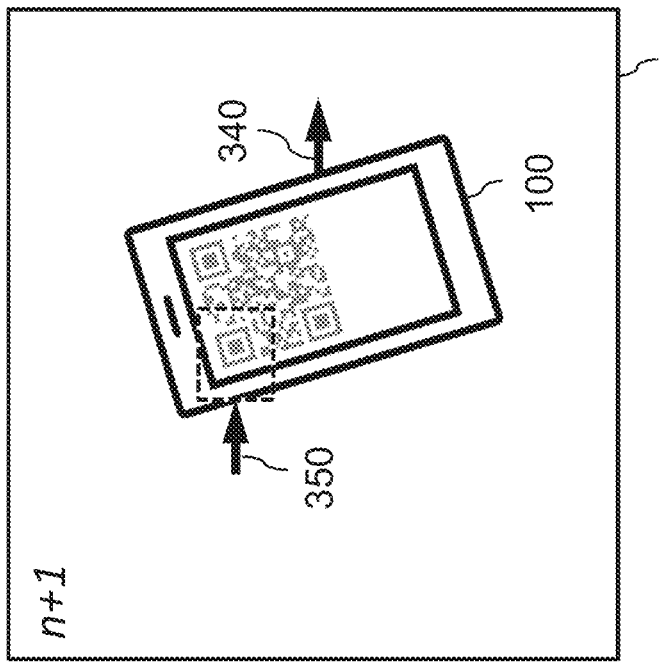
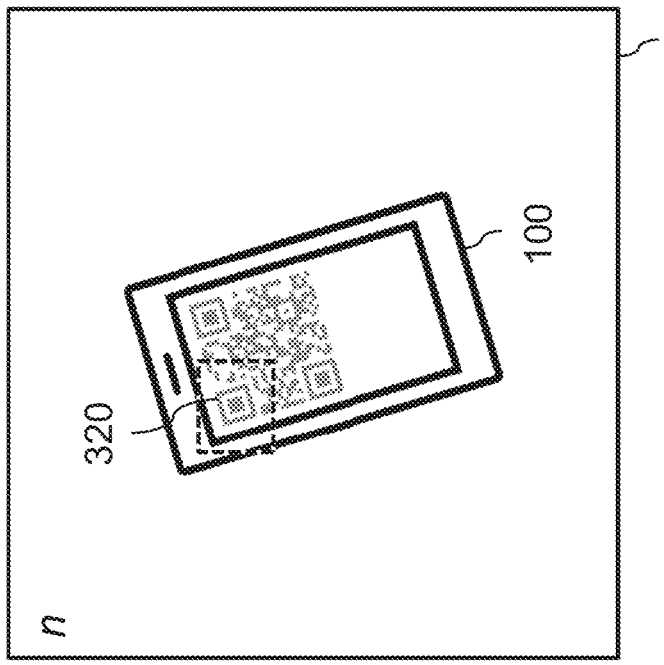
Fig. 3B
Fig. 3A

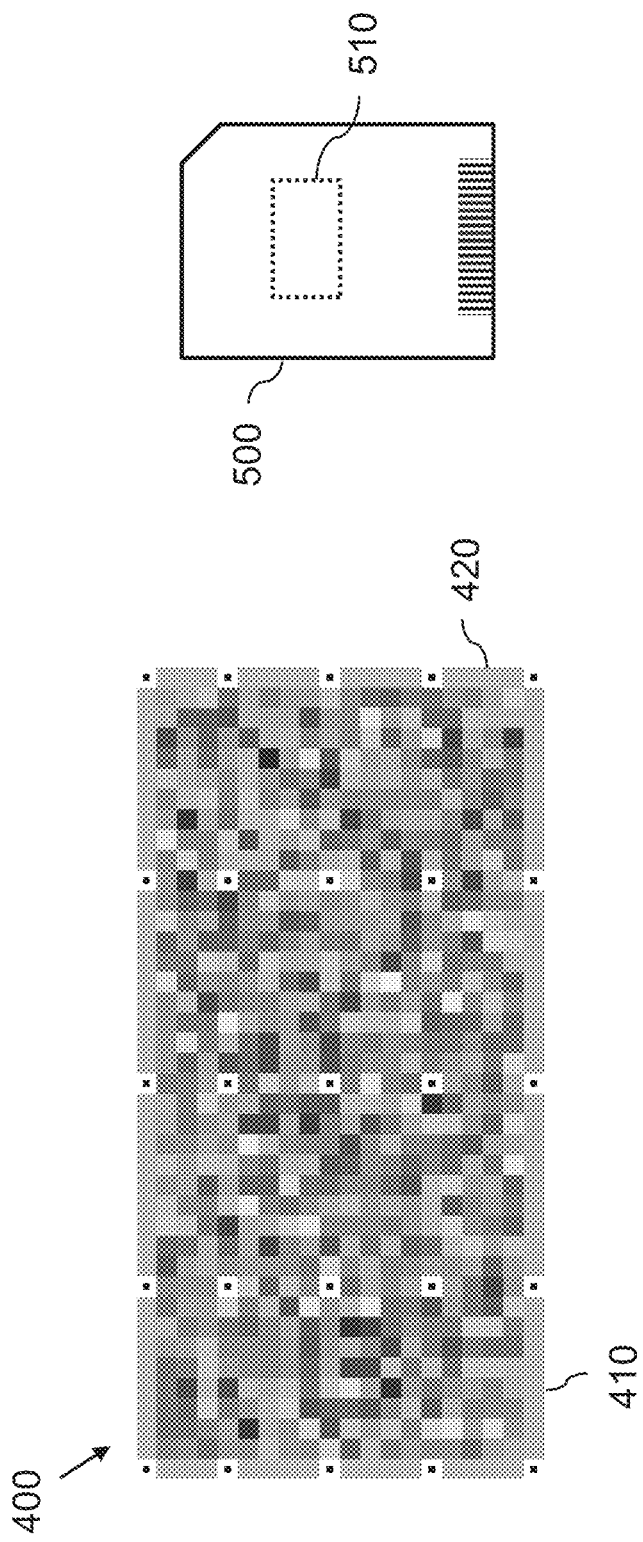

UNIDIRECTIONAL TRANSFER OF DATA FROM SENDER TO RECEIVER

CROSS-REFERENCE TO RELATED APPLICATIONS

This application claims priority to EP patent application Ser. No. 23/153,880.2 filed Jan. 30, 2023, the entire contents of which are hereby incorporated by reference.

FIELD OF THE INVENTION

The invention relates to a system and computer-implemented method for unidirectional transfer of data from a sender device to a receiver device. The invention further relates to the sender device, to the receiver device and to a computer-implemented method performed at the sender device and/or at the receiver device. The invention further relates to a computer-readable medium comprising data representing instructions arranged to cause a processor system to perform a respective computer-implemented method.

BACKGROUND OF THE INVENTION

There are numerous ways to transfer data from a sender device to a receiver device, for example via Wi-Fi, Bluetooth, Ethernet, etc. However, often the data connections established via such wired and wireless networks are bidirectional, which brings the inherent risk that a computer virus or other type of malware is received back from the receiver device, or that vulnerabilities at the sender device are exploited by the receiver device.

One way to approach this problem is to use one-directional (or unidirectional) data communication. For example, a so-called "data diode" is a unidirectional network communication device to transmit data in only one direction. Disadvantageously, a data diode needs custom-built hardware and is therefore expensive. It further only uses temporal modulation to transmit data, which may limit the maximum achievable transmission rate from sender device to receiver device. Another means to transmit data unidirectionally is via a 2D barcode, such as a QR code. Such 2D barcodes may encode data, which data may be transmitted from a sender device to a receiver device by the sender device displaying the 2D barcode and the receiver device scanning the displayed 2D barcode to access the data.

The problem with using 2D barcodes is that the amount of data which can be encoded in a 2D barcode is limited. For example, in a QR code, each block may assume one of only two colors ("dark" and "bright", which in most cases is black & white). As such, a QR code may only code 1 bit per block ("0" or "1"). In another example of a 2D barcode, namely a JAB code, the blocks may assume additional colors, namely red, green, blue, yellow, magenta, cyan. Hence, a block in a JAB code may encode 3 bits (23-8). Nevertheless, to transmit larger amounts of data, a 2D barcode may need to be very high-resolution, which may be problematic when displaying the 2D barcode but also when capturing it with an image sensor, for example due to sensitivity to noise.

It is known to sequentially display a number of 2D barcodes to transmit larger amounts of data. While such video based QR codes increase the amount of data which may be transferred, it also introduces other problems, such as how to reliably detect the 2D barcodes or how to detect the 2D barcodes in a computationally efficient manner.

It is therefore an object of the invention to provide a unidirectional data transfer which addresses one or more of the above-mentioned problems.

SUMMARY OF THE INVENTION

In accordance with a first aspect of the invention, a computer-implemented method is provided for unidirectional transfer of data from a sender device to a receiver device, wherein the sender device is configured to encode respective parts of the data to be transmitted as respective 2D barcodes and sequentially display the 2D barcodes on a display. The method comprises, at the receiver device:
  using an image sensor, capturing the sequentially displayed 2D barcodes to obtain a series of captured images;
  and in each or a subset of the series of captured images;
  detecting a position of a respective 2D barcode in a respective captured image, wherein detecting the position comprises searching in a search area in the captured image for a position of at least one spatial marker of the 2D barcode and determining the position of the 2D barcode based on the position of the at least one spatial marker;
  scanning the 2D barcode at the detected position to obtain barcode data;
  decoding the barcode data to, together with the barcode data obtained from other captured images, obtain a received version of the transmitted data;
  wherein detecting the position of the 2D barcode comprises determining a degree of apparent motion of the 2D barcode in the series of captured images and determining a size and/or position of the search area based on the degree of apparent motion.

In accordance with a further aspect of the invention, a transitory or non-transitory computer-readable medium is provided, wherein the computer-readable medium comprises data representing instructions arranged to cause a processor system to perform steps of a computer-implemented method as described in this specification.

In accordance with a further aspect of the invention, a receiver device is provided, wherein the receiver device is configured for receiving data from a sender device, wherein the sender device is configured to unidirectionally transmit the data by sequentially displaying 2D barcodes on a display. The receiver device comprises:
  a sensor interface to an image sensor;
  a processor subsystem configured to:
    using the image sensor, capture the sequentially displayed 2D barcodes to obtain a series of captured images;
    and in each or a subset of the series of captured images;
    detect a position of a respective 2D barcode in a respective captured image, wherein detecting the position comprises searching in a search area in the captured image for a position of at least one spatial marker of the 2D barcode and determining the position of the 2D barcode based on the position of the at least one spatial marker;
    scan the 2D barcode at the detected position to obtain barcode data;
    decode the barcode data to, together with the barcode data obtained from other captured images, obtain a received version of the transmitted data;
    wherein detecting the position of the 2D barcode comprises determining a degree of apparent motion of the 2D barcode in the series of captured images and determining a size and/or position of the search area based on the degree of apparent motion.

The above measures involve transferring data unidirectionally from a sender device to a receiver device. The sender device may comprise a display or may be connected to a display. For example, the sender device may be a computer such as a laptop or desktop PC or a mobile device such as a smartphone or tablet. The receiver device may comprise an image sensor or may be connected to an image sensor. Such an image sensor may typically be part of a camera module which, in addition to the image sensor, may also comprise one or more optical components including one or more lenses. The receiver device may for example be a mobile device such as a smartphone, tablet, or a pair of smart glasses.

The sender device may comprise or have access to data which is to be transferred to the receiver device. Such data may take various forms, including but not limited to text data, image data, audio data, etc. At the side of the sender device, the transfer may involve generating a displayable version of the data, namely in the form of a series of 2D barcodes. For that purpose, respective parts of the data may be encoded to generate respective 2D barcodes. Normally, each 2D barcode may encode a different part of the data, but in some cases, there may be overlap in the data between different 2D barcodes, for example for redundancy reasons. The 2D barcode, which may also be referred to as a matrix code or matrix barcode or simply as a 2D code, may be any known type of 2D barcode, including but not limited to a QR code, a JAB code, a Data Matrix, etc. Encoding schemes for such 2D barcodes are known per se. The 2D barcodes may be displayed by the sender device on the display in a sequential manner, e.g., in a video-like manner. For example, every second or every ½, ⅓, ¼, ⅕, 1/10, 1/20, 1/30 or 1/60 of a second, a different 2D barcode may be displayed. This way, the entirety of the data to be transferred may be displayed by the sender device in form of a series of 2D barcodes on the display.

The receiver device may capture the series of 2D barcodes displayed on the display with its image sensor. For example, in case the receiver device is a mobile device with a built-in camera, the camera may be pointed at the sender device's display to capture the contents of the display. Such capture may result in a sequence of captured images, which may in some embodiments may be captured by recording a video of the sender device's display. In each or at least a subset of the captured images, the receiver device may detect a position of a respective 2D barcode and then scan the 2D barcode at the identified position to obtain barcode data. Detecting the position of the 2D barcode may for example involve detecting one or more spatial markers in or in a vicinity of the 2D barcode. Scanning the 2D barcode may involve determining the value of the data elements of the 2D barcode (e.g., whether a data element assumes the value of "0" or "1" in a QR code), for example using image analysis. Once the barcode data is obtained, the barcode data may be decoded to, together with the barcode data obtained from other captured images, obtain a received version of the transmitted data. In some embodiments, the barcode data may contain redundancy, for example by the data to be transmitted being encoded using error correcting code, to be able to correct for errors in the transmission. In other embodiments, the barcode may contain the data to be transmitted without additional redundancy measures.

In accordance with the above measures, the data is transmitted from the sender device to the receiver device as a sequence of 2D barcodes and thereby in form of a video-version of a 2D barcode. This increases the amount of data which can be transferred in comparison to using only a 2D barcode as a still image. Advantageously, the spatial resolution of the 2D barcodes does not need to be as high as the spatial resolution needed when using only a still image. In some embodiments, the transmission rate may be further increased by making use of different intensities of the primary colors of the display.

The above measures may be advantageously applied in situations where a certain amount of data transfer is needed, and other methods of data transfer are not available (e.g., no Wi-Fi) or not an option due to security concerns (e.g., military, or medical field) or other available data transfer means cannot transfer enough data (typically for conventional static QR codes). The above measures for example be used in the medical field to transmit patient data such as an X-ray image from doctor to patient without the risk of infecting the doctor's computer with a computer virus from the smartphone of a patient.

With continued reference to the above measures, it is noted that to be able to decode a 2D barcode, the receiver device may have to detect the position of the 2D barcode in a respective captured image. For that purpose, the 2D barcode may comprise or may be accompanied by one or more spatial markers, with the term 'spatial markers' including spatiotemporal markers, e.g., spatial markers which also have a temporal presence. Such markers may have a known appearance to the receiver device as well as a known spatial relation to the 2D barcode, for example by being arranged at respective corners of the 2D barcode. By detecting the position of the marker(s) in the captured image, the receiver device may thus determine the position of the 2D barcode and proceed with decoding the transmitted data encoded in the 2D barcode. The use of spatial markers in 2D barcodes is known per se and such spatial markers may also be referred to as 'fiducial markers'.

Disadvantageously, detecting a spatial marker in a captured image (which process may elsewhere also be referred to as 'marker detection') may be computationally complex. This may especially apply when the series of 2D barcodes contains a sizeable amount of data which is to be transmitted from the sender device to the receiver device, in which case the 2D barcodes may be relatively high-resolution and may equally require the captured images to be of high-resolution. Performing image analysis at high-resolution is computationally complex. The problem of computational complexity may be further aggravated when considering that the position of the spatial marker may change between captured images, for example due to movement of the sender device and/or movement of the receiver device. As a result of such relative movement, the position of the 2D barcodes in the captured images may change, for example gradually or abruptly. Such a change in position of the 2D barcode may elsewhere also be referred to as an 'apparent motion' of the 2D barcode, referring to the fact that the 2D barcode may appear to move in the captured images. To accommodate such apparent motion of the 2D barcode, the receiver device may detect the marker(s) repeatedly over time, for example periodically, e.g., in every captured image (also referred to as 'frame') or every n-th frame or adaptively when motion is detected. More frequent marker detection further increases the computational load of the marker detection. Particularly for battery-operated receiver devices, such as smartphones, smart glasses, tablet devices, etc., such an increase in computational load is disadvantageous.

The above measures address this problem by using a search area in which the marker is detected. This search area is typically a subset of the entire captured image, which in itself may already decrease the computational load of the marker detection. In addition, by way of the above measures, the size and/or position of the search area may be selected based on a detected degree of apparent motion. This for example allows the size of the search area to be limited, and/or the position of the search area to remain unchanged, if no or little apparent motion is detected, whereas in cases of sizable apparent motion, the size of the search area may be increased and/or the position of the search area may be adjusted to account for the likely change in position of the marker. This may allow the search area to be kept relatively small on average, thereby keeping the computational complexity of the marker detection relatively limited, while continuing to be able to reliably detect the position of the marker(s) and thereby the position of the 2D barcode in the captured images.

Optionally, the method further comprises, and the processor subsystem of the receiver device is further configured for, selecting the size of the search area in positive correlation with the degree of apparent motion. If the degree of apparent motion is small, meaning the movement of the 2D barcode within the captured image is small, the search area may remain small, whereas if the degree of apparent motion is large, meaning the movement of the 2D barcode within the captured image is large, the search area is preferably increased to ensure that the spatial marker can be detected at its new position. As such, the size of the search area may be adaptively selected based on the degree of apparent motion, for example proportionally to the degree of apparent motion.

Optionally, the method further comprises, and the processor subsystem of the receiver device is further configured for, determining the position of the search area in the captured image based on the position of a previously found spatial marker in a previous captured image. Once a spatial marker is found in a captured image, the position of the spatial marker may be considered as a reference position when detecting the position of the spatial marker in a subsequently captured image. In other words, a previous position of the spatial marker may be used as a starting point to find a current position of the spatial marker. In particular, there is a relatively high likelihood that a spatial marker can be found at the position of a previously found spatial marker. Namely, it is likely that the apparent motion is relatively small or even (almost) zero if the frame rate at which the receiver device captured images is relatively high compared to the degree of apparent motion. Namely, the higher the frame rate, the smaller the apparent motion between consecutive images will be. In addition, it may generally be expected that during the capture of the 2D barcode, the relative position of the sender device and receiver device remain substantially unchanged, e.g., by a user trying to hold his/her smartphone still while capturing the 2D barcode. This is taken into account by the receiver device determining the position of the search area in the captured image based on the position of a previously found spatial marker in a previous captured image.

Optionally, the method further comprises, and the processor subsystem of the receiver device is further configured for, estimating the apparent motion of the 2D barcode between at least a pair of captured images to obtain an estimate of the apparent motion of the 2D barcode, and determining the location of the search area in the captured image to compensate for the apparent motion of the 2D barcode. The apparent motion may be estimated by the receiver device, for example using known local or global motion estimation techniques. By estimating the apparent motion of the 2D barcode, e.g., in terms of size and direction, the apparent motion may be compensated, in that the search area may be repositioned in accordance with the apparent motion of the 2D barcode. This may allow the size of the search area to be kept relatively small.

Optionally, the estimate of the apparent motion for a current captured image is obtained as an estimate of the apparent motion between one of:
  at least two previous captured images, wherein the apparent motion is extrapolated to the current captured image;
  a previous captured image and the current captured image; and
  a previous captured image and a next captured image, wherein the apparent motion is interpolated to the current captured image.

Optionally, the apparent motion is estimated using a global motion estimation technique. It is likely that the apparent motion of the 2D barcode is a result of a relative movement between the sender device and the receiver device. In such a case, the apparent motion of the 2D barcode may be well captured by a global motion technique as the remaining image content in the captured image may be subjected to a same or similar movement. An advantage of global motion estimation is that it is typically less computationally complex than local (e.g., block or pixel-based) motion estimation.

Optionally, the size of the search area may be selected inversely proportionate to a certainty of the estimation of the apparent motion. It is known per se to determine the certainty of motion estimation, for example based on match errors or the like. This way, if the estimate of the apparent motion is expected to be reliable, i.e., the certainty is high, the search area may be reduced or limited in size, while if the estimate is expected to be unreliable, the search area may be increased in size.

The following aspects of the invention and optional measures, including accompanying embodiments which are described elsewhere in this specification, may be used in or with a receiver device which is configured to detect the position of the 2D barcode by determining a degree of apparent motion of the 2D barcode in the series of captured images and determining a size and/or position of the search area based on the degree of apparent motion, but also without the receiver device being configured to detect the position of the 2D barcode by determining a degree of apparent motion of the 2D barcode in the series of captured images and determining a size and/or position of the search area based on the degree of apparent motion. In the latter case, the receiver device may be configured to detect the position of the 2D barcode in another manner.

In a further aspect of the invention, a sender device is provided comprising:
  a data storage interface to a data storage;
  a display output to a display;
  a processor subsystem configured to:
    via the data storage interface, access the data to be transmitted to the receiver device;
    encode respective parts of the data to generate respective 2D barcodes; and
    via the display output, sequentially display the 2D barcodes on the display.

Optionally, the method further comprises, at the sender device, and wherein the processor subsystem of the sender device is further configured for, generating the 2D barcodes in a format having at least two color channels, wherein in the encoding, the data is divided over the at least two color channels so as to include a first amount of data in a first color channel of the display data and a second amount of data in a second color channel of the display data, wherein the first amount differs from the second amount. The 2D barcode may be displayed on a color display which is capable of displaying display data having at least two color channels. For example, the display may be a RGB or RGBY display. To increase the data transfer rate to the receiver device, the data to be transmitted may be divided over the color channels, meaning that a part of the data may be transmitted via one color channel and another part of the data may be transmitted via another color channel. It was found, however, that the images captured by the receiver device may often be compressed by the camera subsystem or other (software) component of the receiver device, with the compression differently affecting the data sent via the different color channels. In particular, it has been found that the compression ratio may be different for the different color channels, resulting in there being more compression artifacts in one color channel than in another color channel. Greater compression, and in particular more compression artifacts, may negatively affect the reliability of the data transfer. To avoid the data in a particular color channel being not decodable or corrupted by errors due to compression artifacts, a different amount of data may be transmitted via the respective color channels. For example, a lower amount of data may be transmitted via the color channel for which it has been determined that its data is subjected to a higher compression ratio. This way, the reliability of the data transfer may be increased, or more data may be transmitted from the sender device to the receiver device while maintaining a same reliability.

Optionally, the first color channel represents a color or spectrum to which the image sensor is more sensitive than the color or spectrum represented by second color channel, and wherein the method further comprises, at the sender device, and wherein the processor subsystem of the sender device is further configured for, encoding a larger amount of data in the first color channel than in the second color channel. Compression techniques may be designed based on perceptual considerations, which may, amongst others, mean that the compression ratio may be lower for color channels which represent colors or a spectrum to which the image sensor is more sensitive, as compression artifacts may be especially visible in such color channels. Accordingly, the sender device may transmit more data via this color channel than via another color channel as its lower compression ratio may allow a higher data transfer rate.

Optionally, the at least two color channels comprise a red channel, a green channel and a blue channel, wherein the method comprises encoding a larger amount of data in the green channel than in the red channel and/or encoding a larger amount of data in the green channel than in the blue channel and/or encoding a larger amount of data in the red channel than in the blue channel. The human eye is typically more sensitive to green than to blue and red, and more sensitive to red than to blue. Image sensors are typically designed to approximate the sensitivity of the human eye. Accordingly, most data may be transmitted via the green color channel. In a specific embodiment, the most data may be transmitted via the green color channel, the second to most data may be transmitted via the red color channel, and the least data may be transmitted via the blue color channel. For a so-called RGBY display, the most data may be transmitted via the yellow color channel, followed by the green color channel, then followed by the red color channel, and finally by the blue color channel.

Optionally, a respective 2D barcode comprises a payload part containing encoded parts of the data to be transmitted and a non-payload part comprising one or more spatial markers, wherein a spatial resolution of the payload part in the first color channel is different from the spatial resolution of the payload part in the second color channel so as to carry different amounts of data. An efficient way to transfer more data via a color channel is to increase the spatial resolution of the payload part of the 2D barcode in the respective color channel relative to the other color channel(s).

Optionally, the one or more spatial markers are identical or different in appearance in each of the color channels.

Optionally, the one or more spatial markers are provided only in one or a subset of the color channels. Optionally, the one or more spatial markers are provided only each of the color channels.

Optionally, the method further comprises, at the sender device, and wherein the processor subsystem of the sender device is further configured for, adding temporal error correction code to the series of 2D barcodes to enable the receiver device to perform temporal error correction. The data in the series of 2D barcode may be encoded such that temporal error correction is possible. This in turn may enable the detection and correction of temporal errors. In particular, momentary deficiencies in the capture, such as for example an individual 2D barcode not being captured at all or one of the captured images being blurry due to an autofocus error, may be corrected. The temporal error correction may be combined with spatial error correction to obtain a spatiotemporal error correction capable of detecting and correcting errors by exploiting data redundancy in the spatial domain and/or data redundancy in the temporal domain.

Optionally, the payload part is spatially scrambled using a scrambling scheme, wherein the scrambling scheme is different in respective 2D barcodes and known or recoverable at the receiver device. It may occur that a part of the 2D barcode in the captured image is obfuscated, for example by a reflection of a light source on the surface of the display of the sender device. Such obfuscation may remain at the same spatial position over several captured images, for example when the sender device and the receiver device are both held still, which in turn may mean that even if the same 2D barcode were to be transmitted again, the data contained in the obfuscated part of the 2D barcode may remain undecodable. A prolonged obfuscation of a spatial part of the 2D barcodes may also hinder spatial, temporal, or spatiotemporal error correction. The scrambling of data may decorrelate respective parts of the data within the spatial canvas in the 2D barcode, which in turn may allow spatially localized errors to be dealt with, e.g., by error correction or re-transmission of the data contained in a respective 2D barcode.

Optionally, the method further comprises, at the sender device, and wherein the processor subsystem of the sender device is further configured for, adding sequence numbering information to the series of 2D barcodes. For example, header information may be included in each 2D barcode, for example as part of the payload. This header information may include the sequence numbering information, e.g., by indicating the number of the current 2D barcode within the overall sequence of 2D barcodes.

It will be appreciated by those skilled in the art that two or more of the above-mentioned embodiments, implementations, and/or optional aspects of the invention may be combined in any way deemed useful.

Modifications and variations of any system, device, computer-implemented method or any computer-readable medium, which correspond to the described modifications and variations of another one of said entities, can be carried out by a person skilled in the art on the basis of the present description.

BRIEF DESCRIPTION OF THE DRAWINGS

These and other aspects of the invention will be apparent from and elucidated further with reference to the embodiments described by way of example in the following description and with reference to the accompanying drawings, in which

FIGS. 3A-3B illustrate motion compensation of the search area by which the position of the search area is moved in accordance with a detected motion;

FIG. 6 shows an example of a 2D barcode with spatial markers; and

FIG. 7 shows a computer-readable medium comprising data.

It should be noted that the figures are purely diagrammatic and not drawn to scale. In the figures, elements which correspond to elements already described may have the same reference numerals.

LIST OF REFERENCE NUMBERS AND ABBREVIATIONS

Figure 1:
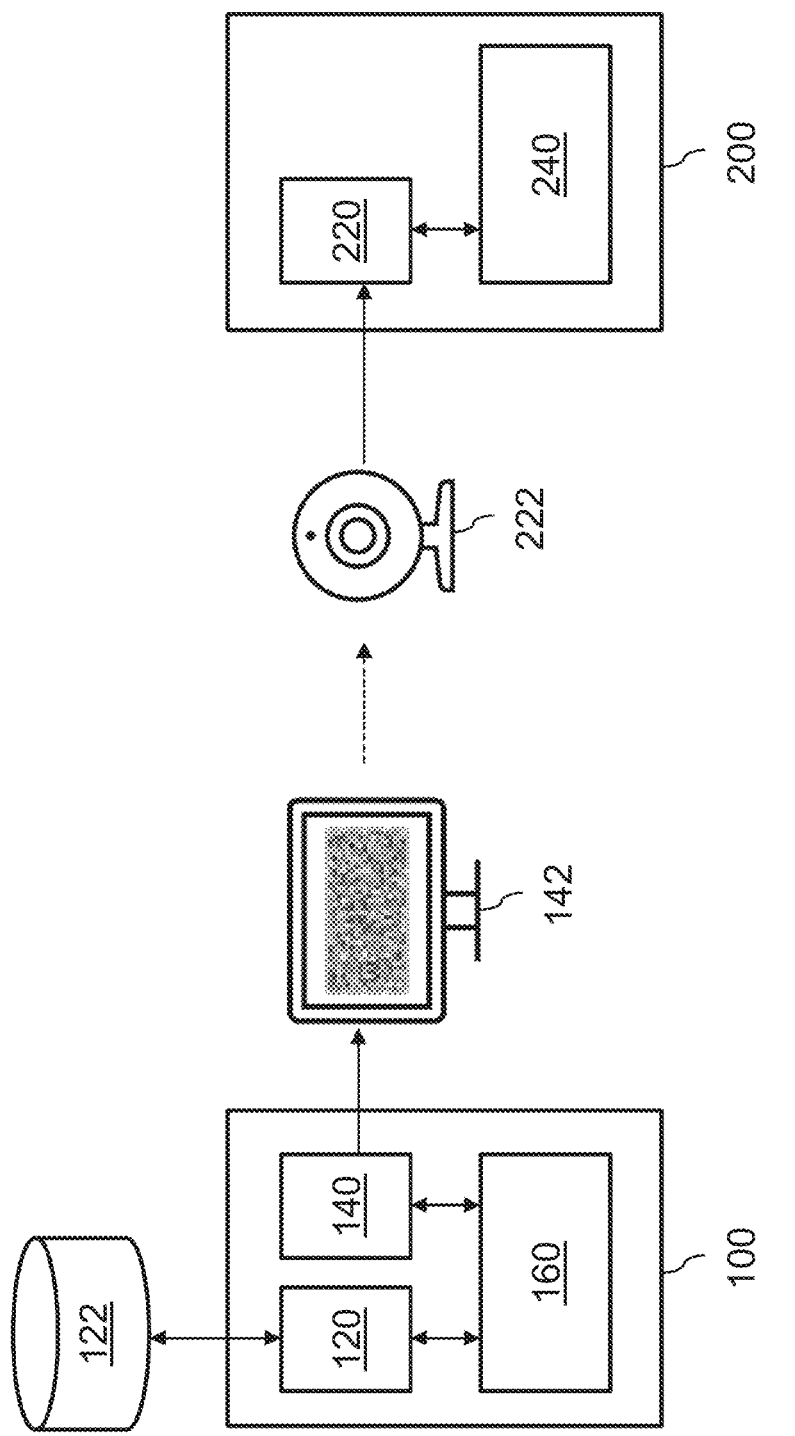
FIG. 1 shows a sender device configured for unidirectional transfer of data to a receiver device, wherein the unidirectional transfer comprises the sender device encoding data to be transmitted as respective 2D barcodes and sequentially displaying the 2D barcodes on a display, and the receiver device capturing images of the 2D barcodes and decoding the 2D barcodes so as to obtain a received version of the transmitted data.

The following list of reference numbers is provided for facilitating the interpretation of the drawings and shall not be construed as limiting the claims.

100 sender device
120 data storage interface
122 data storage
140 display output
142 display
160 processor subsystem
200 receiver device
220 sensor interface
222 image sensor
240 processor subsystem
300-303 captured image
310-312 2D barcode
320 spatial marker
330 initial search area (entire image)
332 default size search area
334 enlarged search area
340 apparent motion
350 motion-compensated repositioning of search area
360 payload data part
400 2D barcode
410 line segment in first primary or secondary color
420 line segment in first primary or secondary color
500 non-transitory computer-readable medium
510 stored data

DETAILED DESCRIPTION OF EMBODIMENTS

FIG. 1 illustrates the unidirectional transfer of data from a sender device 100 to a receiver device 200. The sender device 100, which is configured for said unidirectional transfer of data to the receiver device 200, may comprise a data storage interface 120 to a data storage 122, a display output 140 to a display 142 and a processor subsystem 160 which may be configured to, during operation of the sender device 100, via the data storage interface 120, access the data to be transmitted to the receiver device, encode respective parts of the data to generate respective 2D barcodes, and via the display output 140, sequentially display the 2D barcodes on the display 142. The receiver device 200, which may be configured to receive data from the sender device 100, may comprise a sensor interface 220 to an image sensor 222 and a processor subsystem 240 which may be configured to, using the image sensor 222, capture the 2D barcodes which are sequentially displayed on the display 142 to obtain a series of captured images, and in each or a subset of the series of captured images, detect a position of a respective 2D barcode in the captured image, scan the 2D barcode at the identified position to obtain barcode data, and decode the barcode data to, together with the barcode data obtained from other captured images, obtain a received version of the transmitted data.

Briefly speaking, an exemplary operation of the sender device and the receiver device may be the following. Here and elsewhere, the sequence of 2D barcodes may also be referred to as a 'video barcode'. On the sender device, a user may select a file containing data to be transmitted, or such data may be selected automatically. The sender device may then generate a video barcode and display the video barcode on its display. The receiver device may comprise a camera which is able to capture the video barcode. From the captured video data, the data which was transmitted by the sender device may be decoded. The thus-obtained data is elsewhere also referred to as a 'received version' of the data and may be a bit true copy of the data at the sender device but may also be an approximation thereof, e.g., if errors occurred during transmission. It is noted that the occurrence of such errors may be acceptable in some applications, e.g., image or video transfer, while in others, the occurrence of errors may be avoided or reduced by encoding the data using an error correction scheme. It is further noted that in cases where a file is selected at the sender device, either the entire file may be transmitted (e.g., with headers, metadata, etc.) or only the contents of the file, in which case the receiver device may in some embodiments reconstruct the file locally or generate another file to store the contents.

With continued reference to FIG. 1, it is noted that the data storage 122 may take various forms, such as a memory, a solid-state drive or an array of solid-state drives, a hard drive, or an array of hard drives, etc. The data storage interface 120 may be a type of interface which corresponds to the type of data storage, e.g., a memory interface, a solid-state drive interface, etc. By way of example, FIG. 1 shows the data storage 122 to be an external data storage, but the data storage 122 may also be an internal component of the sender device 100. Similarly, by way of example, FIG. 1 shows the display 142 to be an external display, but the display 142 may also be an internal component of the sender device 100. The display interface 140 may likewise take any suitable form, such as an internal display interface, e.g., based on MPI DSI or MDDI, or an external display interface, e.g., based on HDMI or USB-C, etc. With reference to the receiver device 200, it is noted that the image sensor 222 may be part of a camera, which may be an external camera (e.g., a webcam) or an internal camera of the receiver device 200. The sensor interface 220 may take any suitable form to receive captured image data from the image sensor 222. With reference to the processor subsystems 160, 240 of the sender device and receiver device, each of these may be embodied by a single CPU, such as a x86 or ARM-based CPU, but also by a combination of such CPUs and/or other types of processing units, such as GPUs.

Although not shown in FIG. 1, the sender device 100 and the receiver device 200 may each also comprise additional components. For example, the receiver device 200 may, like the sender device 100, also comprise a data storage interface to a data storage and/or a display interface to a display, while both the sender device 100 and the receiver device 200 may comprise a user input interface to a user input device, such as a touch screen, a keyboard, a mouse, etc., to enable a user to interact with a respective device.

In some embodiments, the functions described with reference to the processor subsystem of either the sender device 100 or the receiver device 200 may be implemented by software, for example as an application such as a mobile app. For example, the sender device 100 may be a computer or mobile device which is configured to execute a sender app, which app allows selecting a file for transfer and which then displays a video barcode, while the receiver device 200 may be a computer or mobile device which is configured to execute a receiver app, which app allows capturing the video barcode with the device's camera and which then provides access to the transmitted data. In some embodiments, both the sender device 100 and the receiver device 200 may be a same type of device, e.g., a computer, mobile phone, tablet device, smart watch, etc. In other embodiments, the sender device 100 may be a different type of device than the receiver device 200. For example, the sender device 100 may be a mobile device with integrated display, while the receiver device 100 may be smart glasses with integrated camera.

Figure 2B:
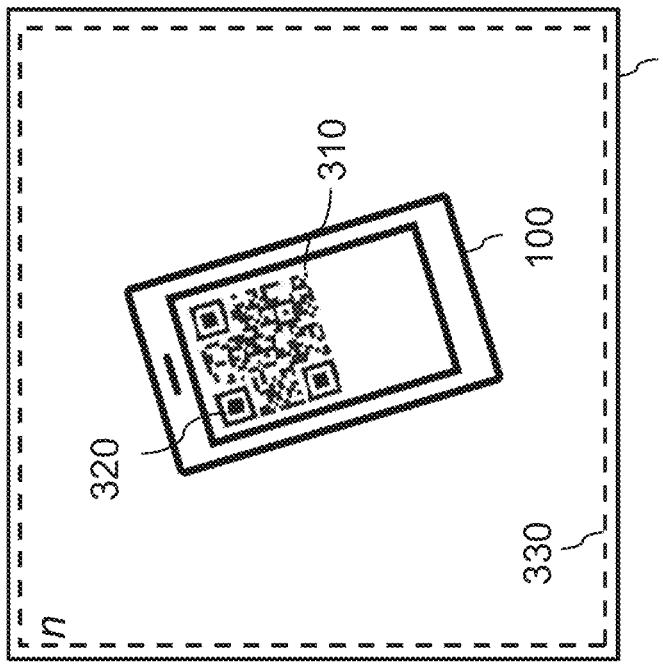
FIG. 2B shows an initial search area which may be used by the receiver device to detect a position of the 2D barcode in the captured image.
Figure 2A:
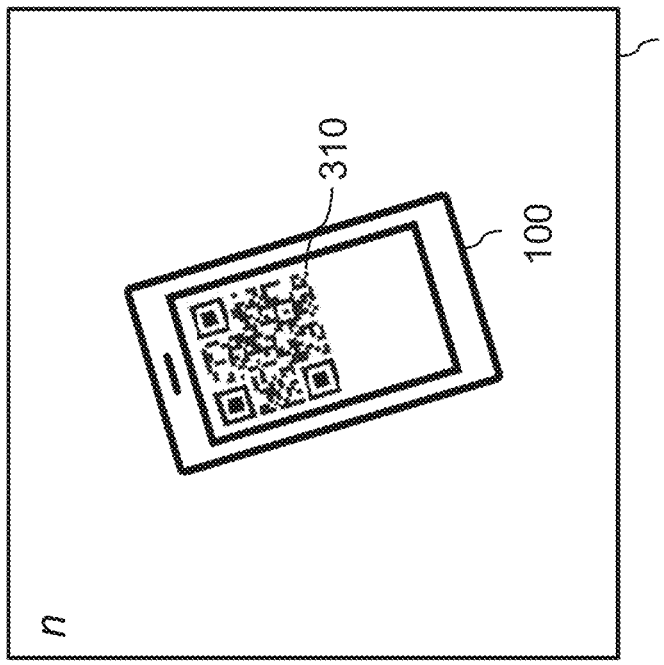
FIG. 2A shows an image captured by the receiver device, with the captured image showing a 2D barcode displayed by the sender device.

FIG. 2A shows an image 300 captured by the receiver device, with the captured image showing a 2D barcode 310 displayed by the sender device 100. In the example of FIG. 2A and elsewhere, the sender device 100 is, by way of example, a mobile device with a built-in display while the receiver device (not shown) may be a mobile device with a built-in camera. This may enable a user of the receiver device to record the display of the sender device 100, for example by pointing the camera of the receiver device towards the display of the sender device, so as to capture the series of 2D barcodes displayed by the sender device. The example of FIG. 2A shows a given captured image, e.g., a frame n, which may be a 'first' image captured by the receiver device of the series of 2D barcodes.

FIG. 2B shows an initial search area 330 which may be used by the receiver device to detect a position of the 2D barcode 310 in the captured image. This may be further explained as follows. To be able to decode the barcode data contained in the 2D barcode 310 (also referred to as 'payload'), the position of the 2D barcode 310 in the captured image 300 may need to be determined by the receiver device. For that purpose, the 2D barcode 310 may be provided with one or more spatial markers 320 which may have a known spatial relationship with the barcode data contained in the 2D barcode. For example, as shown in FIG. 2B, the spatial markers 320 may be arranged at respective corners of the 2D barcode 310. Moreover, the spatial markers 320 may have an appearance which may be known to the receiver device, e.g., by being standardized or by the receiver device being previously informed of the appearance of the spatial markers, to enable the receiver device to detect the spatial marker(s) in the captured image 300. Initially, when no prior knowledge is available on the position of the spatial marker(s), the receiver device may search for the spatial marker(s) in the entire captured image 300, which may correspond to an initial search area 330 covering the entire captured image 300. This may enable the receiver device to detect the position of the spatial marker(s) 320 within the captured image 300 despite having no prior knowledge on their position. It will be appreciated that in some embodiments, prior knowledge on the position of the spatial marker(s) may be available. For example, the user may be guided to position the camera of the receiver device such that the 2D barcode displayed on the display of the sender device fits within an outline shown in the digital camera viewfinder of the receiver device. In such cases, there is a high likelihood that the 2D barcode is located within the outline, which may be used by the receiver device to select the initial search area accordingly, and only if the spatial marker(s) is not found within this initial search area, the search area may be enlarged, e.g., to cover all of the captured image.

Figure 2D:
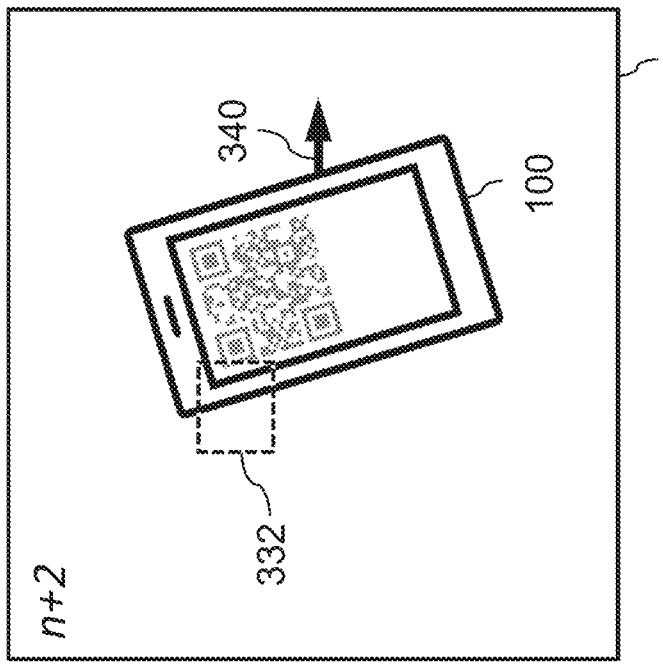
FIG. 2D shows the sender device having an apparent motion in the captured images, which apparent motion may be the result of a movement of the sender device and/or of the camera of the receiver device relative to each other.
Figure 2C:
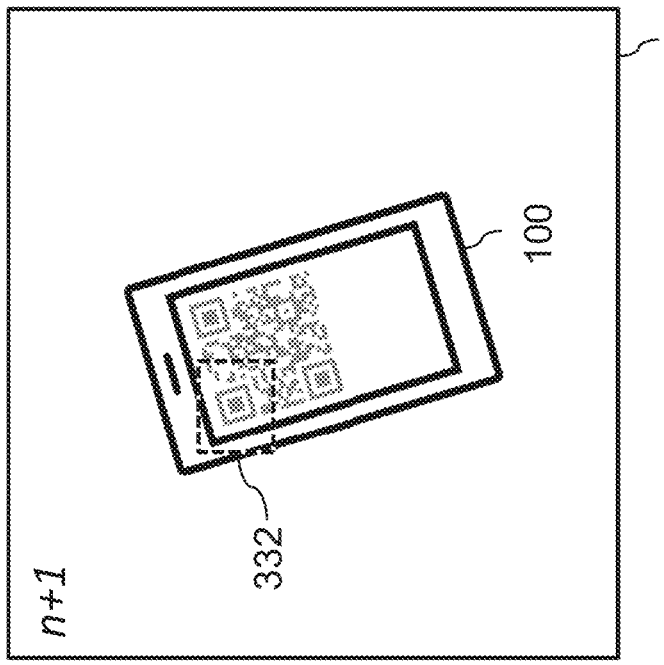
FIG. 2C shows a default search area which may be positioned at a position at which a spatial marker of the 2D barcode was previously found.

FIG. 2C shows a next captured image 301 in form of a (now) current frame n+1. After having located the position of the spatial marker(s) in the previous frame, a smaller search area 332 may be used to find the spatial marker(s) in the current frame n+1. This search area may for example have a default size and may be positioned at the position in the captured image 301 at which the spatial marker was previously found in the previous frame n as there may be a high likelihood that the spatial marker will be at or near this previously found position. In this respect, it is noted that FIG. 2C shows only one search area 332 for one of the spatial markers. It is noted, however, that the receiver device may make use of several search areas, e.g., for each or at least multiple of the spatial markers.

In the example of FIG. 2C, the 2D barcode 332 is shown to remain at the same or substantially same position within frame n+1 as within frame n. A reason for this may be the following. The capture frequency of the receiver device may be relatively high so that relative movement between the receiver device and the sender device is limited between consecutive frames. This allows the spatial marker to be found by searching at or nearby the previously found position of the spatial marker. However, in other examples, there may be more substantial differences in the position of the 2D barcode between consecutive frames, for example due to movement or reorientation of the receiver device (e.g., the user fails to hold the receiver device still or fails to keep the camera pointed at the sender device), movement or reorientation of the sender device, the capture frequency being relatively low, the temporal distance between captured frames being relatively large, etc.

FIG. 2D shows a result of such substantial relative movement, showing a change in position of the 2D barcode in the captured image 302 representing frame n+2 compared to the previous captured image representing frame n+1. Such a change of position may also be referred to as 'apparent motion' 340 of the 2D barcode. As a result, the spatial marker of the 2D barcode may not be located within the search area 332 anymore.

Figure 2F:
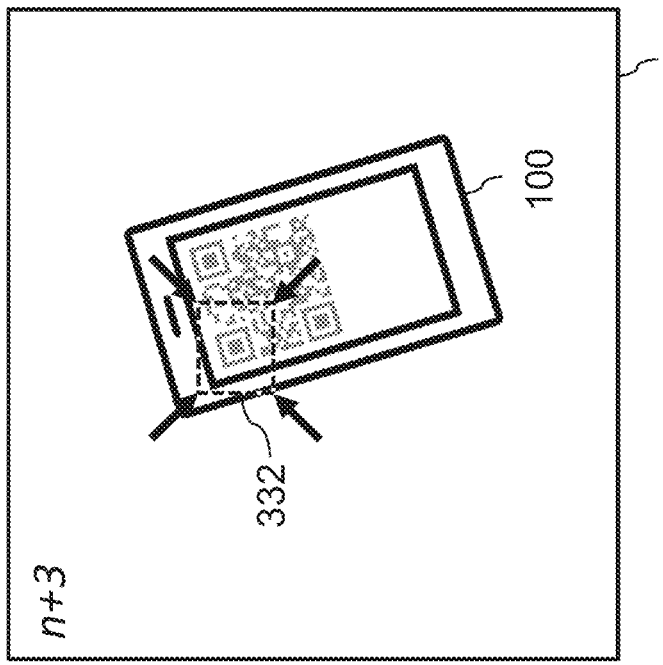
FIG. 2F shows the receiver device reverting to the default size of the search area at the new position of the spatial marker.
Figure 2E:
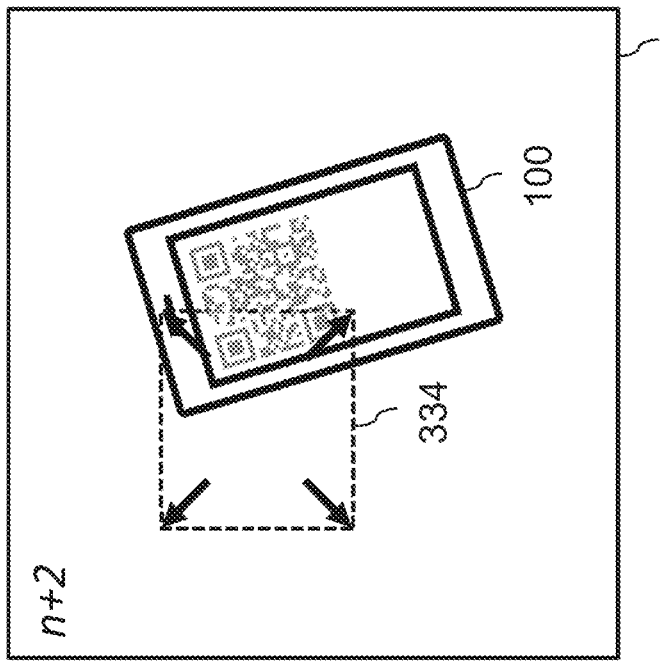
FIG. 2E shows an enlarged search area which may be used by the receiver device to detect the new position of the spatial marker of the 2D barcode.

FIG. 2E shows the receiver device enlarging the search area to establish an enlarged search area 334 for frame n+2 as the previous search area did not include the spatial marker anymore. To determine when to enlarge the search area, and in some embodiments to which degree, the receiver device may estimate the degree of apparent motion, for example by image or video analysis or by using an accelerometer of the receiver device to detect movement or reorientation of the receiver device, and determine the size and/or the position of the search area based on the degree of apparent motion. For example, if the apparent motion is estimated to be relatively large, the search area may be enlarged accordingly. On the other hand, if the apparent motion is estimated to be small or (near) zero, the search area may again be reduced in size, e.g., to its default size. FIG. 2F shows a result of the latter, namely the receiver device reverting to the default size of the search area 332 at the new position of the spatial marker in the captured image 303, i.e., in frame n+3, as the apparent motion was estimated by the receiver device to be small or (near) zero.

It is noted that the change in size of the search area may be considered to represent a motion adaptive mechanism in that the size of the search area may be adapted to the degree of apparent motion, for example proportionally or in discrete steps (e.g., 'small', 'medium', 'large'). In other examples, also the position of the search area may be adjusted based on the apparent motion. For that purpose, the receiver device may not only determine the degree, e.g., the magnitude, of the apparent motion but also its direction, for example using a local or global motion estimation technique. This may allow the receiver device to reposition the search area to the expected location of the spatial marker. FIGS. 3A-3B illustrate such repositioning of the search area as the search area is moved 350 in accordance with the apparent motion 340 of the 2D barcode. Such repositioning of the search area may also be referred to as 'motion compensation' and may take various forms. For example, different forms of motion estimation may be used, such as local motion estimation (e.g., block- or pixel-based) or global motion estimation. In some examples, the motion may be estimated without image or video analysis, for example by using measurements performed by an accelerometer integrated into the receiver device. This way, movement, or a change in orientation of the receiver device may be compensated, which may allow at least partial compensation of the apparent motion of the 2D barcode.

With continued reference to the motion estimation, it is noted that the search area may be positioned in a current frame n based on the motion estimated between the previous frame n−1 and the current frame n. However, this is not a limitation, in that the motion may also be estimated between different pairs of frames, e.g., a previous n−1 and a next frame n+1 or a pre-previous frame n−2 and a previous frame n−1. In the former case, interpolation may be used to determine the apparent motion with respect to the current frame n, while in the latter case, extrapolation may be used, e.g., based on Kalman filtering.

Figure 4:
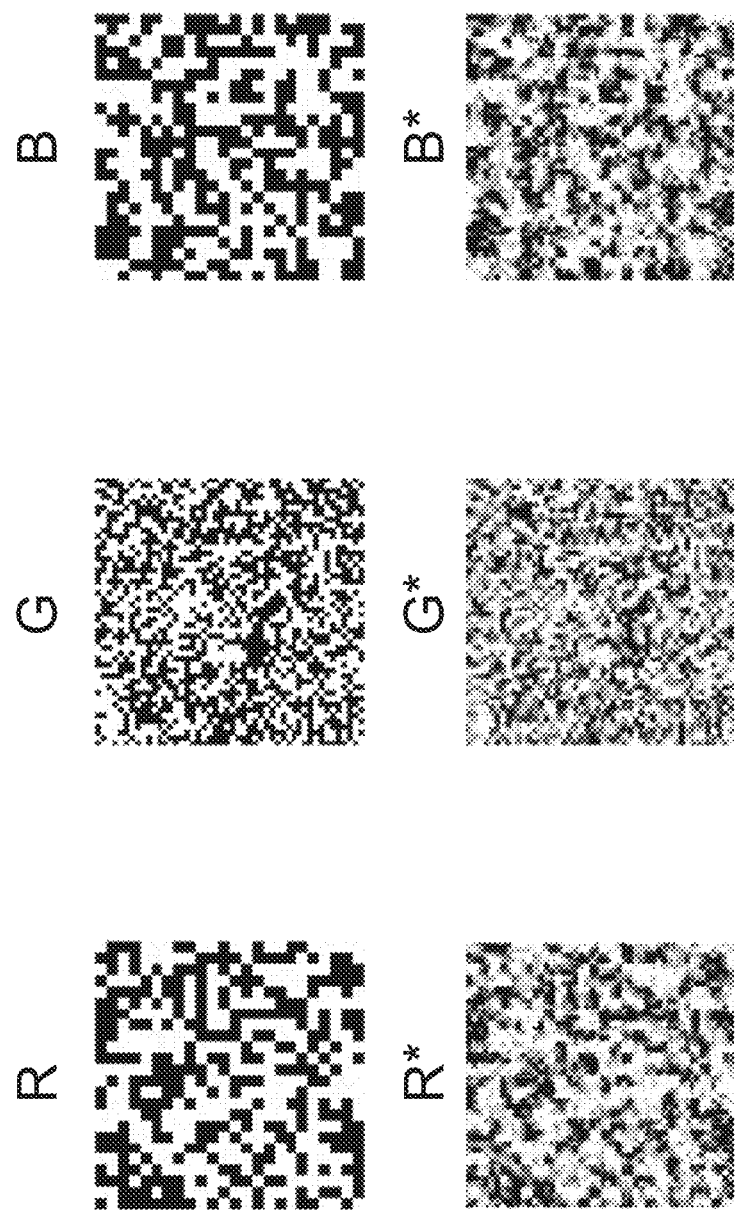
FIG. 4 shows a 2D barcode in which the amount of data included in the red, green, and blue color channels differs, in that the 2D barcode component in the green color channel has a higher spatial resolution than in the red and blue color channels, with the top row showing the original 2D barcode components and the bottom row showing the 2D barcode components after capture, compression and decompression at the receiver device.

FIG. 4 shows another aspect of the transmission of data from a sender device to a receiver device as a series of 2D barcodes, namely that the 2D barcodes may be generated in a format having at least two color channels, with the data to be transmitted being divided over the at least two color channels. In such cases, a different amount of data may be transmitted via each color channel. FIG. 4 shows a specific example in which the 2D barcode is displayed on a RGB display, and in which the sender device transmits more data via the green color channel ('G') than via the red ('R') and blue ('B') color channels. More specifically, the 2D barcode component in the green color channel may occupy the same amount of screen estate on the display of the sender device but encode more data as the payload part of the 2D barcode may have a higher spatial resolution in the green color channel than in the red and blue color channels. This unequal distribution of data over the color channels may take into account that the captured images may be compressed at the receiver device and that the green color channel may be prioritized relative to the red and blue color channels in the compression, in that a lower compression ratio may be used, which may lead to fewer compression artifacts and in turn may allow more data to be reliably transmitted via the 2D barcode. To illustrate the effect of such compression on the discernability of the 2D barcode, FIG. 4 shows the 2D barcode components in the respective color channels after compression and decompression as respectively R*, G*, and B*.

An exemplary data ratio for R:G:B may be 1:2:1, meaning that twice as much data may be transmitted via the green color channel than via the red and blue color channels. Another exemplary data ratio may be 1.5:2:1, meaning that twice as much data may be transmitted via the green color channel than via the blue color channel and that 1.5 times as much data may be transmitted via the red color channel than via the blue color channel. Furthermore, it is noted that although FIG. 4 does not show the spatial markers of the 2D barcode but only the payload part, the 2D barcode may be provided with one or more spatial markers, with a respective spatial marker being present in one, multiple, or all of the color channels. In some examples, despite different amounts of data being transmitted via the respective color channels, a respective spatial marker may have a same or similar size, appearance, and position in each color channel. This way, the spatial marker(s) may only have to be detected once by the receiver device and not separately for each color channel.

In some embodiments, the sender device may provide for temporal error correction when generating the series of 2D barcodes. It is noted that it is known per se to use spatial error correction in 2D barcodes. The sender device may enable such temporal error correction in addition, or alternatively to, spatial error correction. One example of temporal error correction is using a so-called repetition code, meaning that the sender device may repeat the transmission of the data after the series of 2D barcodes has been displayed once. This way, the receiver device may, if one or more 2D barcodes have been missed or could not be decoded from the first transmission of the data, obtain the missing 2D barcodes from a second or later transmission of the data. In addition, or alternatively, to such repeated transmission of the data, data redundancy may be introduced into the transmitted frames. For that purpose, a mechanism may be introduced which conveys information to the receiver device about how each 2D barcode fits into the series of 2D barcodes. Such information may also be referred to as sequence numbering information. For that purpose, header information may be included in each 2D barcode, for example as part of the payload. This header information may include the sequence numbering information, e.g., by indicating the number of the current 2D barcode within the overall sequence. This way, the receiver device may keep track of which 2D barcodes from the series are missing or could not be decoded. In addition, or alternatively, additional 2D barcodes may be generated which may contain so-called parity information, for example in form of a linear combination of the payload of other 2D barcodes. These additional 2D barcodes may enable the receiver device to reconstruct missing 2D barcodes if a sufficient number of regular and parity 2D barcodes have been received by the receiver device.

The following provides a more detailed background and description of temporal error correction. Namely, error correction coding may be described as follows. Given a data vector M={m_0, m_1, . . . , m_k} there may exist a mapping such that f(M)=P, where P={p_0, p_1, . . . , p_n}. This function may be referred to as a parity generating function. The transmitted data may be given as D=[M P]. f(..) may be constructed in such a manner that an inverting function exist for e known elements of D, such that g(D, E)=M, where E is a binary vector with at least e ones such that all ones represent the known values of D while the zeros represent unknown values (or known incorrect values) of D.

One such implementation is the use of 2D parity-check codes which may operate on individual bits. Such 2D parity-check codes may be explained by first considering a 1D parity-check code as follows: given a data vector A={a_0, a_1, a_2, a_3}, the parity generating function may be obtained by calculating the finite field sum on all elements, also known as the XOR sum. This result may be referred to as the parity of A, and often denoted as p_A. For example, if A={0, 1, 1, 0}, the parity p_A=1. When transmitting D=[A, p_A], it may thus be possible to correct a single error if it only one bit is missing, e.g., when D=[0 1×0 0] is received. The missing element x may then be reconstructed by taking the known correct elements of D and calculating their parity, which in this example yields x=XOR (0,1,0,0)=1.1D parity-check codes may correct at most one missing or known incorrect element, i.e., one 'erasure'. To increase the erasure correcting capabilities further, the parity may be calculated in 2D, e.g., on a matrix representing the payload of the 2D barcode, as follows. Namely, using the same type of parity generating function as in 1D parity-check codes, it is possible to rearrange A such that one may detect and correct errors in 2D. This may be done by restructuring A→[[a_0 a_1],[a_2 a_3]]. A parity generating function may then be generated which may output parity per row and per column of A.

As an example, $A = \begin{bmatrix} 0 & 1 \\ 1 & 1 \end{bmatrix}$ may obtain $D = \begin{bmatrix} 0 & 1 & 1 \\ 1 & 1 & 0 \\ 1 & 0 & \end{bmatrix}$.

Using the above temporal error correction, scheme, it may be possible to correct for three and in some cases as much as 2*(width of D)−1 missing elements.

It is noted that other erasure correction methods exist and may equally used as temporal error correction, including but not limited to erasure correction methods based on Reed-Solomon codes, turbo codes, and LDPC codes.

Figure 5:
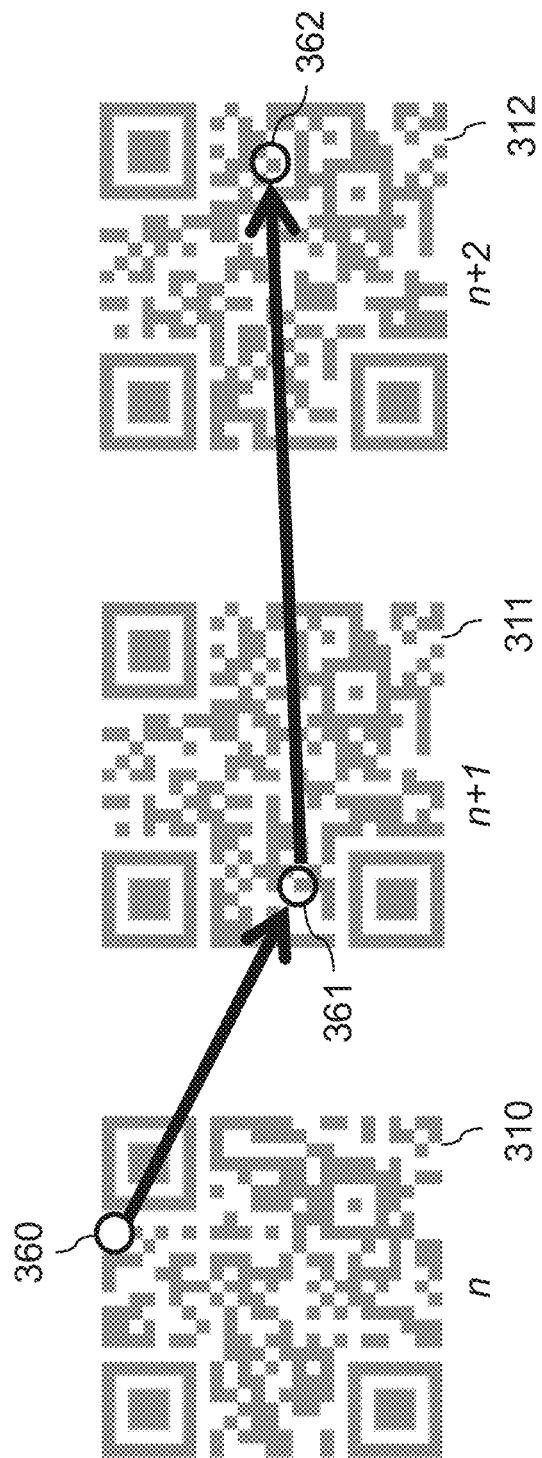
FIG. 5 shows a series of 2D barcodes in which the payload part is spatially scrambled using a scrambling scheme which is known or recoverable at the receiver device.

FIG. 5 shows a series of 2D barcodes in which the payload part is spatially scrambled using a scrambling scheme which is known or recoverable at the receiver device. This figure relates to the following. In some embodiments, the payload part of a 2D barcode may be spatially scrambled using a scrambling scheme, wherein the scrambling scheme is different in respective 2D barcodes and known or recoverable at the receiver device. Such a scrambling scheme may also be referred to as a scrambling pattern, shuffling scheme, or shuffling pattern, and may introduce a spatial shuffling of data within the spatial canvas in the 2D barcode, which in turn may allow spatially localized errors to be dealt with, such as reflections. Namely, it may occur that a part of the 2D barcode in the captured image is obfuscated, for example by a reflection of a light source on the surface of the display of the sender device. Such obfuscation may remain at the same spatial position over several captured images, for example when the sender device and the receiver device are both held still, which in turn may mean that even if the same 2D barcode were to be transmitted again, the data contained in the obfuscated part of the 2D barcode may remain undecodable. A prolonged obfuscation of a spatial part of the 2D barcodes may also hinder spatial, temporal, or spatiotemporal error correction. By way of such scrambling of the data, the missing data may be nevertheless obtained by the receiver device, e.g., by error correction or re-transmission of the data contained in a respective 2D barcode. FIG. 5 illustrates such scrambling of the data by showing three consecutive 2D barcodes 310-312 with payload data parts 360-362. These payload data parts 360-361 are data parts which would be, without the use of scrambling, transmitted at a same spatial position within the respective 2D barcodes 310-312, but are now transmitted at different spatial positions. It is noted that the scrambling may be applied to the data before the data is modified to enable spatial and/or temporal error correction, but also afterwards. The scrambling scheme may be known to the receiver device, for example by being transmitted to the receiver device (e.g., in form of a seed for a known scrambling function, or a scrambling pattern) or may be standardized, etc.

FIG. 6 shows an example of a 2D barcode 400 as may be generated by the sender device. While FIGS. 2A-4 show the masked data as encoding 1 bit per element (i.e., per 'block' of the 2D barcode), the data to be transmitted may also be encoded in a way which uses more than 1 bit per element. For example, if an RGB display is used, 8 different intensity levels may be used per color channel, resulting in $8^3$=512 grey levels, which equals $2^9$ bits. FIG. 6 shows a grayscale representation of such an encoding.

FIG. 6 further illustrates that the sender device may display one or more spatial markers in spatial relation to the barcode data of respective 2D barcodes to facilitate detection of the 2D barcodes in the series of captured images. Such spatial markers may for example be or may be comprised of line segments 410 delineating at least part of the 2D barcode. In some embodiments, to facilitate detection of the 2D barcode, a line segment may have a primary color (e.g., red, green, or blue) or a secondary color (e.g., cyan, magenta, or yellow). Different line segments may also have different colors. For example, as also illustrated in FIG. 6, horizontal line segments 410 may have one color, being for example a primary or secondary color, while vertical line segments 420 may have another color, being for example another primary or secondary color. In another example, different colors may be used for the line segments at the left, right, top and bottom of the 2D barcode. Yet another example is that a 2D barcode may be provided with a 2D array of spatial markers, in which the color of the individual spatial markers is chosen such that the array of spatial markers shows a symbol, such as a cross in a 3×3 array of spatial markers:

| Cyan | Yellow | Cyan |
|------|--------|------|
| Yellow | Yellow | Yellow |
| Cyan | Yellow | Cyan | or a triangle in a 5×3 array of spatial markers:

| Cyan | Cyan | Magenta | Cyan | Cyan |
|------|------|---------|------|------|
| Cyan | Magenta | Magenta | Magenta | Cyan |
| Magenta | Magenta | Magenta | Magenta | Magenta |

In general, the colors of line segments may preferably not occur in the data part of the 2D barcode, and if different colors are used for different line segments, or in general for different spatial markers, the different colors are preferably distinct from each other in at least one color-space. This may allow different spatial markers to be easily identified, for example by applying a thresholding technique to the captured image in the particular color space. In general, line segments may be identified by identifying pixels belonging to the line segments and by fitting a line through these pixels. The crossing between top/bottom and left/right lines may determine the corners of the data part of the 2D barcode. Thereby, the boundaries of the data part of the 2D barcode may be identified. It is noted that the spatial markers may also have any other suitable form. For example, additional features may be added in the four lines (left, right, top, bottom) to further enhance the position detection. For example, squares may be added between line segments.

In general, the appearance of a spatiotemporal marker may vary between sequentially displayed 2D barcodes, for example at a same frequency as the frequency with which the data in the 2D barcode is refreshed, or at a higher frequency. In other words, the spatiotemporal marker may vary in appearance between the sequentially displayed 2D barcodes at a temporal frequency which is different from the temporal frequency at which the barcode data in the respective 2D barcodes is refreshed. In a specific example, the barcode data may be refreshed at 5 Hz, while the spatiotemporal marker(s) vary in appearance at 10 Hz. In some embodiments, the spatiotemporal marker(s) vary at a frequency that is slightly higher (e.g., 1.1×), somewhat higher (e.g., 2×), much higher (e.g., 10×), etc. than the refresh rate of the barcode data. In other embodiments, the spatiotemporal marker(s) vary at a frequency that is slightly lower (e.g., 1.1×), somewhat lower (e.g., 2×), much lower (e.g., 10×), etc. than the refresh rate of the barcode data. In some embodiment, the spatiotemporal marker(s) vary according to a specific temporal pattern. For example, the intensity of a spatiotemporal marker may vary over time as a sinusoid or as a sawtooth from one intensity state to another and back. In some embodiments, the spatiotemporal marker(s) may be inverted in appearance between consecutive capture frames, or may have any other greatly varying appearance, e.g., a large difference in hue, saturation and/or brightness.

In general, each entity described in this specification may be embodied as, or in, a device or apparatus. The device or apparatus may comprise one or more (micro)processors which execute appropriate software. The processor(s) of a respective entity may be embodied by one or more of these (micro)processors. Software implementing the functionality of a respective entity may have been downloaded and/or stored in a corresponding memory or memories, e.g., in volatile memory such as RAM or in non-volatile memory such as Flash. Alternatively, the processor(s) of a respective entity may be implemented in the device or apparatus in the form of programmable logic, e.g., as a Field-Programmable Gate Array (FPGA). Any input and/or output interfaces may be implemented by respective interfaces of the device or apparatus. Each functional unit of a respective entity may be implemented in the form of a circuit or circuitry. A respective entity may also be implemented in a distributed manner, e.g., involving different devices or apparatus.

It is noted that any of the methods described in this specification, for example in any of the claims, may be implemented on a computer as a computer implemented method, as dedicated hardware, or as a combination of both. Instructions for the computer, e.g., executable code, may be stored on a computer-readable medium 700 as for example shown in FIG. 7, e.g., in the form of a series 510 of machine-readable physical marks and/or as a series of elements having different electrical, e.g., magnetic, or optical properties or values. The executable code may be stored in a transitory or non-transitory manner. Examples of computer-readable mediums include memory devices, optical storage devices, integrated circuits, etc. FIG. 7 shows by way of example a memory device 500.

Examples, embodiments or optional features, whether indicated as non-limiting or not, are not to be understood as limiting the invention as claimed.

Mathematical symbols and notations are provided for facilitating the interpretation of the invention and shall not be construed as limiting the claims.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method for unidirectional transfer of data from a sender device to a receiver device, wherein the sender device is configured to encode respective parts of the data to be transmitted as respective 2D barcodes and sequentially display the 2D barcodes on a display, wherein the method comprises, at the receiver device:

using an image sensor, capturing the sequentially displayed 2D barcodes to obtain a series of captured images;

and in each or a subset of the series of captured images:

detecting a position of a respective 2D barcode in a respective captured image, wherein detecting the position comprises searching in a search area in the captured image for a position of at least one spatial marker of the 2D barcode and determining the position of the 2D barcode based on the position of the at least one spatial marker;

scanning the 2D barcode at the detected position to obtain barcode data;

decoding the barcode data to, together with the barcode data obtained from other captured images, obtain a received version of the transmitted data;

wherein detecting the position of the 2D barcode comprises determining a degree of apparent motion of the 2D barcode in the series of captured images and determining a size and/or position of the search area based on the degree of apparent motion.

2. The method according to claim 1, further comprising selecting the size of the search area in positive correlation with the degree of apparent motion.

3. The method according to claim 1, further comprising determining the position of the search area in the captured image based on the position of a previously found spatial marker in a previous captured image.

4. The method according to claim 1, further comprising:

estimating the apparent motion of the 2D barcode between at least a pair of captured images to obtain an estimate of the apparent motion of the 2D barcode; and determining the location of the search area in the captured image to compensate for the apparent motion of the 2D barcode.

5. The method according to claim 4, wherein the estimate of the apparent motion for a current captured image is obtained as an estimate of the apparent motion between one of:

at least two previous captured images, wherein the apparent motion is extrapolated to the current captured image;

a previous captured image and the current captured image; and a previous captured image and a next captured image, wherein the apparent motion is interpolated to the current captured image.

6. The method according to claim 1, wherein the apparent motion is estimated using a global motion estimation technique.

7. The method according to claim 1, further comprising, at the sender device, generating the 2D barcodes in a format having at least two color channels, wherein in the encoding, the data is divided over the at least two color channels so as to include a first amount of data in a first color channel of the display data and a second amount of data in a second color channel of the display data, wherein the first amount differs from the second amount.

8. The method according to claim 7, wherein the first color channel represents a color or spectrum to which the image sensor is more sensitive than the color or spectrum represented by second color channel, and wherein the method comprises encoding a larger amount of data in the first color channel than in the second color channel.

9. The method according to claim 7, wherein the at least two color channels comprise a red channel, a green channel and a blue channel, wherein the method comprises encoding a larger amount of data in the green channel than in the red channel and/or encoding a larger amount of data in the green channel than in the blue channel and/or encoding a larger amount of data in the red channel than in the blue channel.

10. The method according to claim 7, wherein a respective 2D barcode comprises a payload part containing encoded parts of the data to be transmitted and a non-payload part comprising one or more spatial markers, wherein a spatial resolution of the payload part in the first color channel is different from the spatial resolution of the payload part in the second color channel so as to carry different amounts of data.

11. The method according to claim 10, wherein the one or more spatial markers are identical or different in appearance in each of the color channels.

12. The method according to claim 1, further comprising, at the sender device, adding temporal error correction code to the series of 2D barcodes to enable the receiver device to perform temporal error correction.

13. The method according to claim 12, wherein the payload part is spatially scrambled using a scrambling scheme, wherein the scrambling scheme is different in respective 2D barcodes and known or recoverable at the receiver device.

14. A transitory or non-transitory computer-readable medium, wherein the computer-readable medium comprises data representing instructions arranged to cause a processor system to perform steps of the method according to claim 1.

15. A receiver device configured for receiving data from a sender device, wherein the sender device is configured to unidirectionally transmit the data by sequentially displaying 2D barcodes on a display, wherein the receiver device comprises:

a sensor interface to an image sensor;

a processor subsystem configured to:

using the image sensor, capture the sequentially displayed 2D barcodes to obtain a series of captured images;

and in each or a subset of the series of captured images:

detect a position of a respective 2D barcode in a respective captured image, wherein detecting the position comprises searching in a search area in the captured image for a position of at least one spatial marker of the 2D barcode and determining the position of the 2D barcode based on the position of the at least one spatial marker;

scan the 2D barcode at the detected position to obtain barcode data;

decode the barcode data to, together with the barcode data obtained from other captured images, obtain a received version of the transmitted data;

wherein detecting the position of the 2D barcode comprises determining a degree of apparent motion of the 2D barcode in the series of captured images and determining a size and/or position of the search area based on the degree of apparent motion.

16. A system comprising the receiver device according to claim 15 and a sender device comprising:

a data storage interface to a data storage;

a display output to a display;

a processor subsystem configured to:

via the data storage interface, access the data to be transmitted to the receiver device;

encode respective parts of the data to generate respective 2D barcodes; and via the display output, sequentially display the 2D barcodes on the display.

17. The system according to claim 16, wherein the processor subsystem of the sender device is further configured to generate the 2D barcodes in a format having at least two color channels, wherein in the encoding, the data is divided over the at least two color channels so as to include a first amount of data in a first color channel of the display data and a second amount of data in a second color channel of the display data, wherein the first amount differs from the second amount.

18. The system according to claim 16, wherein the processor subsystem of the sender device is further configured to add temporal error correction code to the series of 2D barcodes to enable the receiver device to perform temporal error correction.

* * * * *